United States Patent [19]

Shaw

[11] Patent Number: 4,787,211
[45] Date of Patent: Nov. 29, 1988

[54] REFRIGERATION SYSTEM

[75] Inventor: David N. Shaw, Unionville, Conn.

[73] Assignee: Copeland Corporation, Sidney, Ohio

[21] Appl. No.: 863,593

[22] Filed: May 15, 1986

Related U.S. Application Data

[63] Continuation-in-part of Ser. No. 636,068, Jul. 30, 1984, Pat. No. 4,594,858, which is a continuation of Ser. No. 569,886, Jan. 11, 1984, abandoned.

[51] Int. Cl.$^4$ .............................................. F25B 7/00
[52] U.S. Cl. ...................................... 62/117; 62/175; 62/228.3; 417/248
[58] Field of Search ...................... 62/510, 196.2, 175, 62/228.3, 228.4, 117; 236/1 EA; 417/248, 246

[56] References Cited

U.S. PATENT DOCUMENTS

| | | | |
|---|---|---|---|
| Re. 29,621 | 5/1978 | Conley et al. | 62/196.2 |
| 1,984,250 | 12/1934 | Chamberlain . | |
| 2,386,198 | 10/1945 | Dodson | 62/510 X |
| 2,434,221 | 1/1948 | Newton . | |
| 2,585,908 | 2/1952 | Backstrom | 62/95 |
| 2,677,944 | 5/1954 | Ruff | 62/510 X |
| 2,714,806 | 8/1955 | Scullen | 62/175 X |
| 2,841,962 | 7/1958 | Richards | 62/174 |
| 2,903,248 | 9/1959 | Walker . | |
| 3,232,524 | 2/1966 | Rice et al. | 417/248 X |
| 3,307,368 | 3/1967 | Harnish | 62/160 |
| 3,513,662 | 5/1970 | Golber | 62/115 |
| 3,668,883 | 6/1972 | Ruff et al. | 62/228.4 X |
| 3,759,052 | 9/1973 | Inoue | 62/115 |
| 4,102,149 | 7/1978 | Conley et al. | 62/196.2 |
| 4,325,223 | 4/1982 | Cantley | 62/126 |
| 4,332,144 | 6/1982 | Shaw | 62/324.1 |
| 4,435,962 | 3/1984 | Mochizuki et al. | 62/175 |
| 4,550,574 | 11/1985 | Hohman | 62/197 |
| 4,554,799 | 11/1985 | Pallanch | 62/509 |
| 4,577,468 | 3/1986 | Nunn, Jr. et al. | 62/113 |

FOREIGN PATENT DOCUMENTS

| | | | |
|---|---|---|---|
| 0076716 | 4/1983 | European Pat. Off. | 62/510 |
| 2039386 | 8/1980 | United Kingdom . | |

OTHER PUBLICATIONS

Thermal Environmental Engineering, James Threlkeld, 1970.
Grasso Data Sheet No. 20, May 1979, "Survey and Comparison of Interstage Cooling Systems for Two-Stage Compression".
Hussmann Information Sheet "Thermoficient Food Store Refrigeration Package".

Primary Examiner—William E. Wayner
Attorney, Agent, or Firm—Harness, Dickey & Pierce

[57] ABSTRACT

There is disclosed a refrigeration system employing multi-stage compressors, several unique modes of operation thereof, a sub-cooler/economizer for sub-cooling the condensed refrigerant prior to vaporization in the evaporator, as well as an improved expansion valve arrangement for controlling second stage discharge temperature, another valve arrangement for controlling economizer liquid discharge temperature, an interstage intercooler for use in a hot water system, a satellite compressor arrangement for ultra-low temperature applications, and an improved liquid-suction heat exchange arrangement.

42 Claims, 5 Drawing Sheets

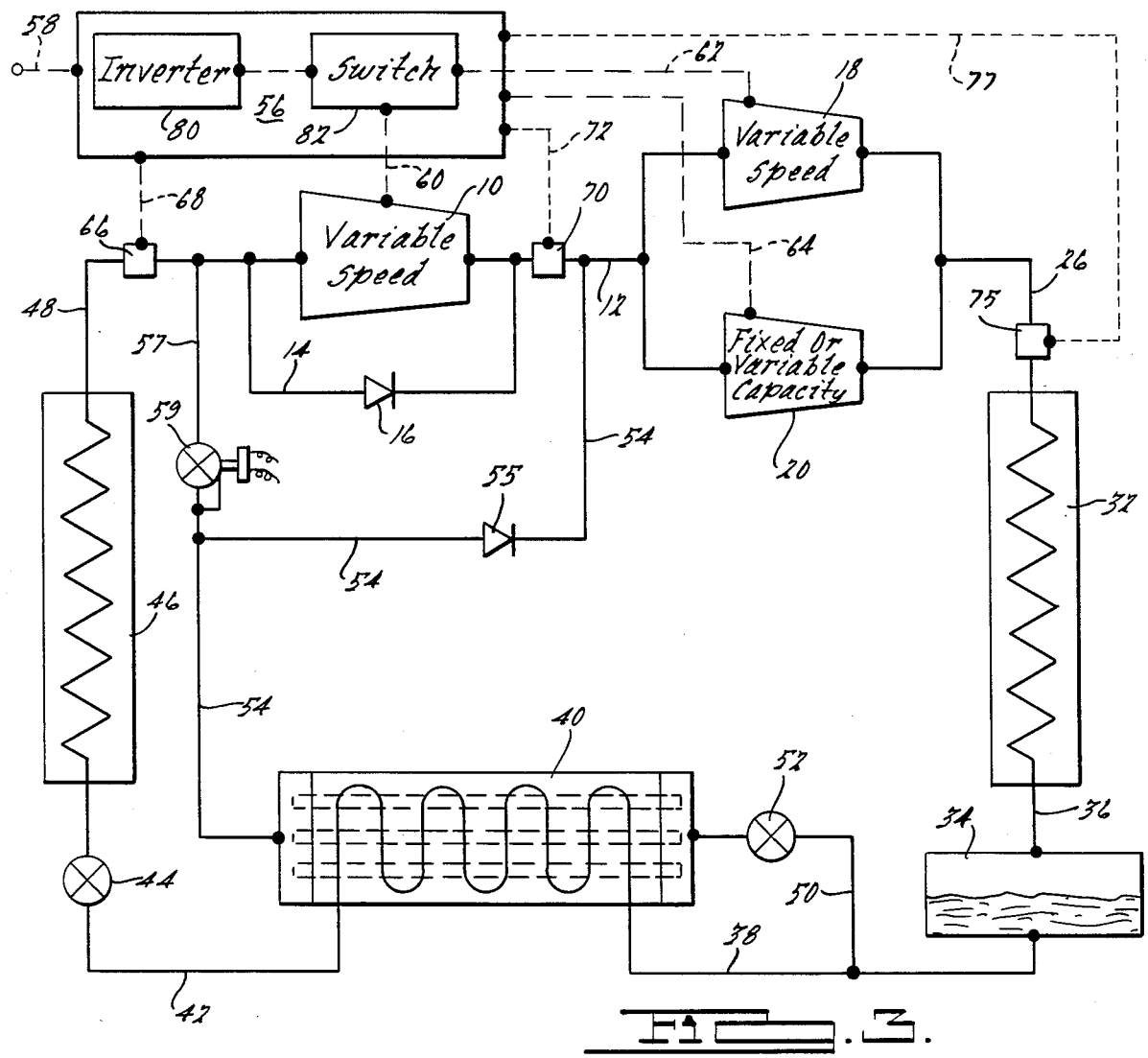
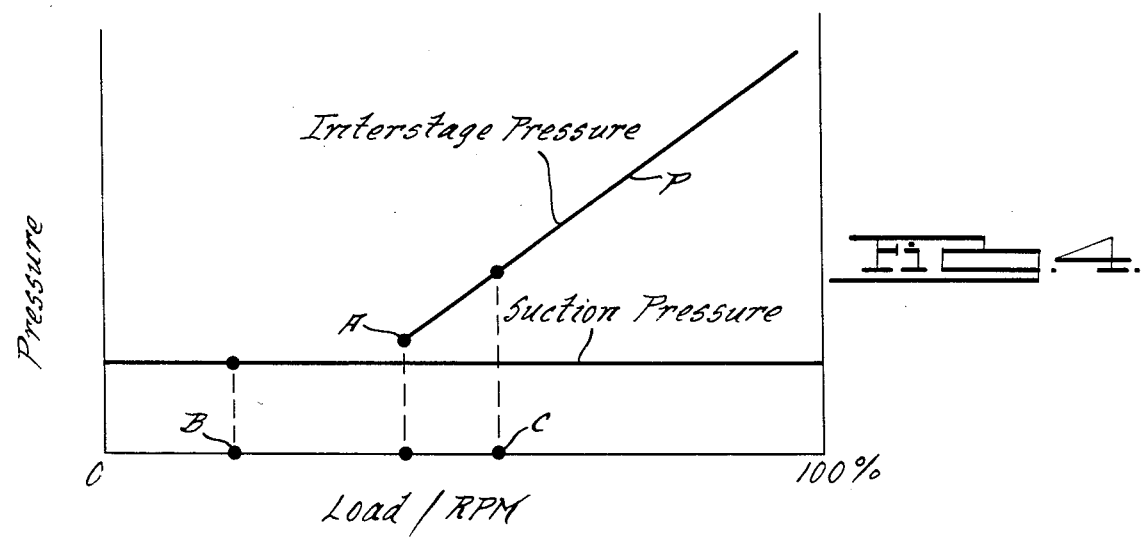

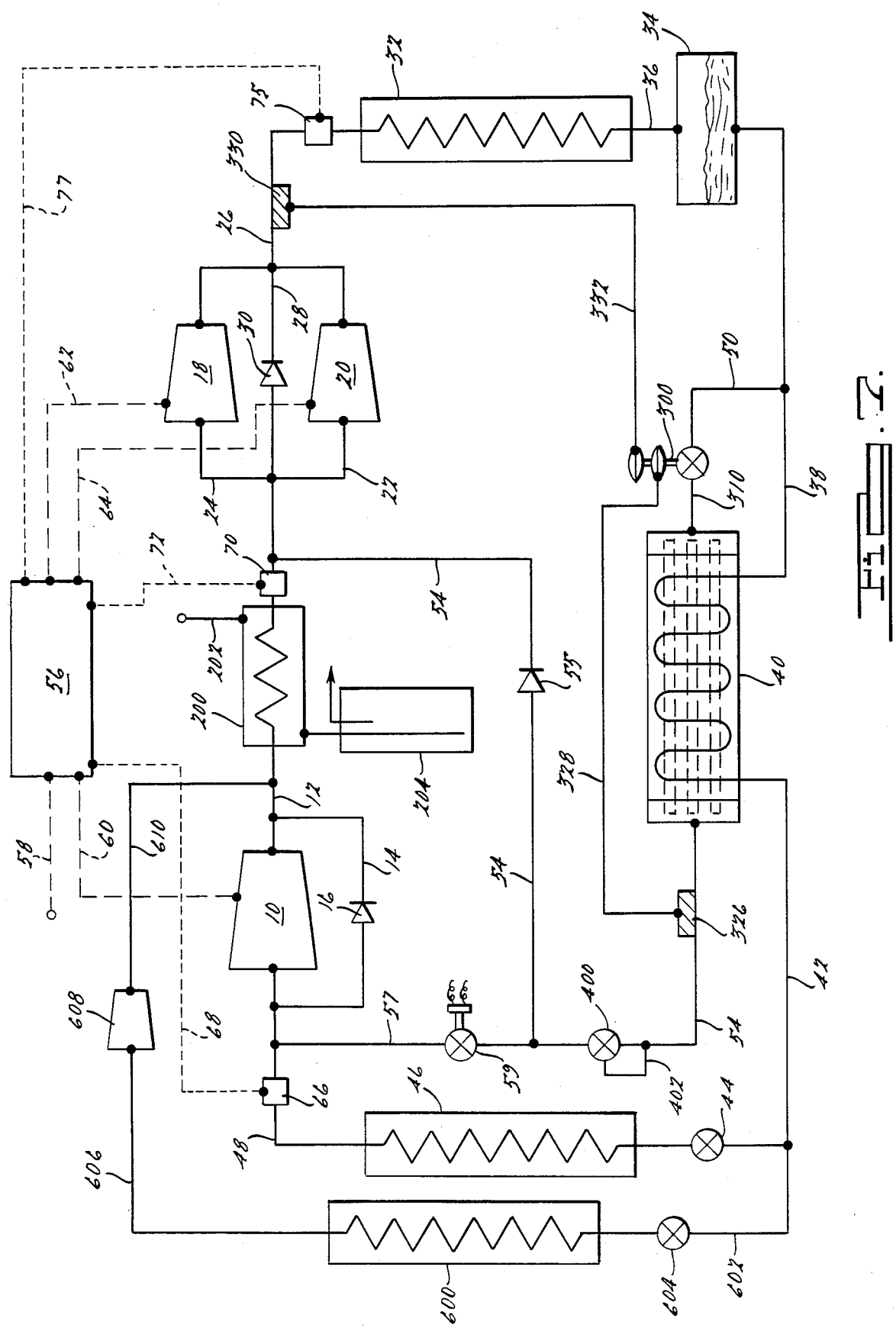

REFRIGERATION SYSTEM

CROSS-REFERENCE TO RELATED APPLICATIONS

This application is a continuation-in-part of applicant's co-pending application Ser. No. 636,068, now U.S. Pat. No. 4,594,858, filed July 30, 1984, which is a continuation of applicant's prior application Ser. No. 569,886 now abandoned filed Jan. 11, 1984. The disclosures of both of the aforesaid parent applications are incorporated herein by reference.

BACKGROUND AND SUMMARY OF THE INVENTION

This invention relates generally to refrigeration and air conditioning systems employing multi-stage compressors, and more particularly to a system utilizing a sub-cooler/economizer for sub-cooling the condensed refrigerant prior to vaporization in the evaporator, as well as other unique features and modes of operation, whereby there is provided high flexibility of application while maximizing efficiency.

The invention is particularly suited for supermarket food refrigeration and freezer applications. Current supermarket systems generally comprise three or more single stage fixed capacity compressors of equal or unequal size and all connected in parallel, which are individually turned on and off in response to system load in order to attempt to match same.

The primary objects of the present invention therefore are to provide a refrigeration system which is highly efficient, which has redundancy and reliability, and which has load matching without excessive cycling. More specifically it is the provision of a system which provides relatively constant suction pressure over an extremely wide load range, without significant loss of efficiency, and which provides for consistent liquid line temperature control, thus facilitating the use of highly efficient liquid-suction heat exchange. A related advantage of the present system is that it permits the discharge pressure to float so that it is unnecessary to provide any artificial head pressure control (i.e., condenser flooding devices, etc.), which unnecessarily load the compressors. The invention also eliminates the need for oil coolers because the refrigerant temperatures are so well controlled. Furthermore, the subcooler provides lower pressure drops across the evaporator so that higher suction pressures can be utilized, thereby enhancing efficiency.

Another significant advantage of the refrigeration circuit of the present invention is that it permits the use of R-22 as the sole refrigerant in a given supermarket, both for high and low temperature applications, while providing a performance and efficiency improvement over standard systems.

Another advantage of the present invention is the fact that it provides an inherent improvement in compressor reliability due to lower imposed compression ratios, as compared to standard systems. Furthermore, it provided redundancy of equipment as compared to many existing parallel compressor systems.

Another advantage of the present invention resides in the fact that it utilizes very simple controls to provide highly efficient operation, including accurate suction pressure control as well as reliable liquid line control, as compared with standard systems. Control may be provided by the use of only two basic transducers for total system control.

A further advantage of the present invention resides in the fact that it may be operated in many different highly efficient modes depending on the particular application at hand.

DESCRIPTION OF THE DRAWINGS

FIG. 3 is a schematic diagram of a refrigeration circuit embodying another feature of the present invention.

FIG. 4 is a plot of interstage pressure versus load/rpm for the system of FIG. 3.

FIG. 8 is a schematic diagram of a refrigeration circuit which is believed to be an ideal, practical supermarket system.

DESCRIPTION OF THE PREFERRED EMBODIMENTS

Figure 1:
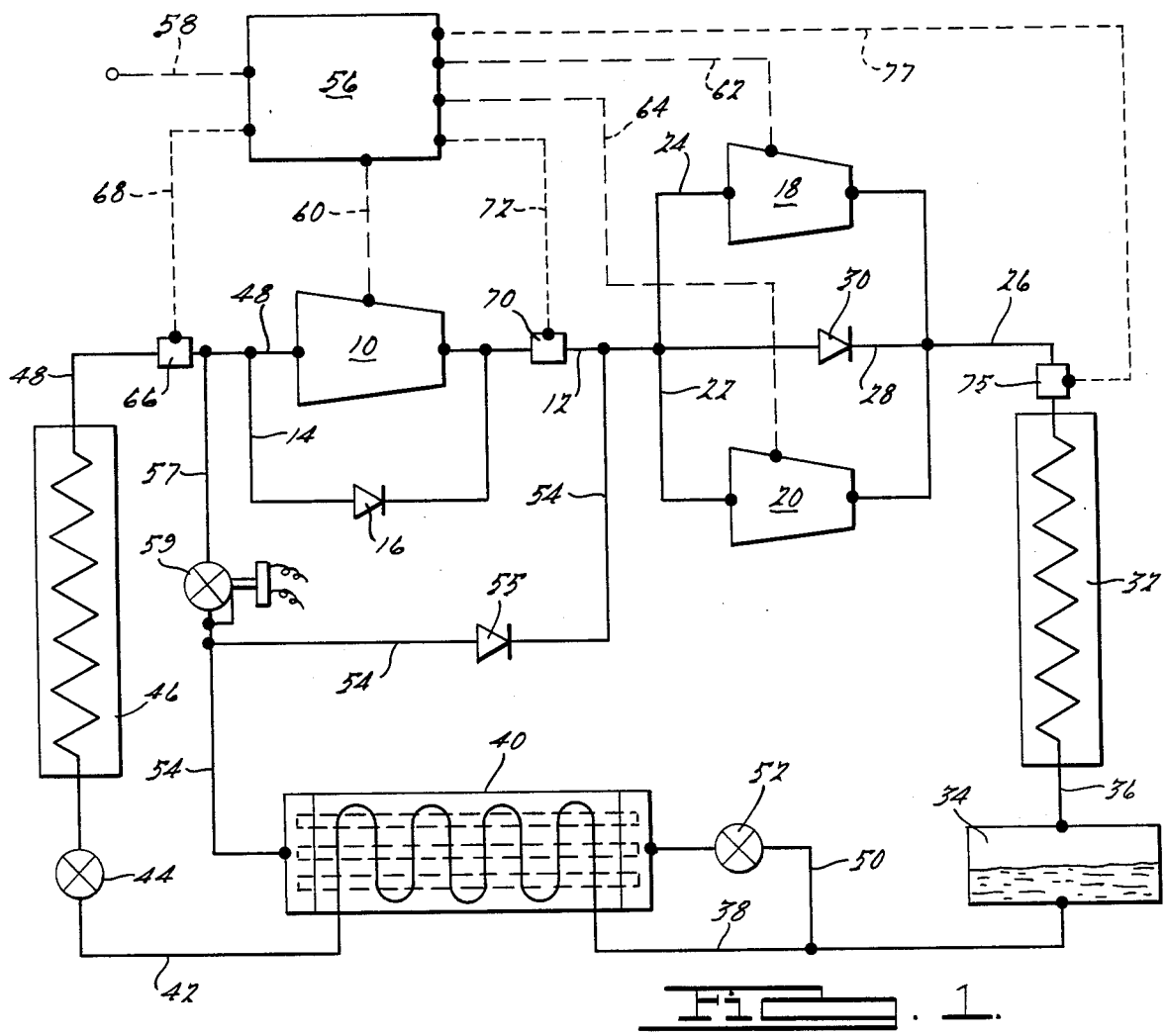
FIG. 1 is a schematic diagram of a refrigeration circuit embodying several features of the present invention.

There is illustrated in FIG. 1 a basic food refrigeration system particularly suited for use in a supermarket, which embodies a number of features and modes of operation of the present invention. The system compriises a first stage booster compressor 10 the output of which flows via a conduit 12 to two or more second stage compressors, two of which are indicated at 18 and 20. These compressors are connected in parallel via conduits 22 and 24 and the discharge therefrom communicates with a discharge line 26. A bypass conduit having a check valve 16 therein is disposed in parallel with compressor 10 to permit flow through the circut when first stage compressor 10 is de-energized, and a bypass conduit 28 having a check valve 30 therein is placed in parallel with second stage compressors 18 and 20 to provide for flow through the circuit in the event the second stage compressors are de-energized (and are of the type not providing unrestricted through-flow when deenergized).

Discharge line 26 communicates with a condenser 32 which prforms a normal condensing function, discharging both liquid and vapor into a receiver 34 via a conduit 36. Liquid refrigerant in receiver 34 flows through a conduit 38 to a subcooler or economizer 40. The subcooled liquid refrigerant from the economizer flows through a conduit 42 to an expansion valve 44, from which it is expanded and flows into an evaporator 46 which performs its normal function of removing heat from the environment in which it is disposed. Evaporator 46, in a typical supermarket application, would normally be a number of separate evaporators in parallel in a number of food dispensing cases, each case having its own expansion valve. The gaseous refrigerant exiting evaporator 46 flows through conduit 48 back to the suction inlet of compressor 10.

Economizer 40 (which is essentially a heat exchanger) operates to expand a portion of the condensed refrigerant from the circuit downstream of the condenser via a bleed conduit 50 and an expansion valve 52 for subcooling liquid refrigerant flowing to the evaportor. A conduit 54 feeds the expanded portion of the refrigerant to an interstage point between the outlet of the first stage compressor and the inlet of the second stage compressors.

As used herein the term "compressor" includes any type of motor driven refrigerant compression device. The compressors of FIG. 1, each of which would normally be motor-compressors of any general type, are controlled and energized by a suitable controller 56 which is connected to a source of electrical power via an electrical power lead 58 and to the motors of compressors 10, 18 and 20 via electrical leads 60, 62 and 64, respectively. The driving motor for booster compressor 10 may comprise an induction motor, with controller 56, incorporating a variable speed inverter, in which case controller 62 will function to vary the frequency of the current supplied to the booster motor via lead 60. Other types of motor-speed regulators or variable speed prime movers may be used. Booster compressor 10 may be a variable speed reciprocating compressor, a variable speed screw compressor, a variable speed sliding vane rotary compressor, or the like. For a five-to-one capacity range for the booster compressor, the variance in frequency of the control signal to its motor could be from 20 to 100 Hertz. The high stage compressors may be fixed capacity reciprocating compressors which do not unload and thus always operate at peak efficiency.

The refrigeration circuit as so-far described is the same in general arrangement as that described in the aforesaid parent applications. First stage compressor 10 may be of the variable speed type, modulated by controller 56 in response to evaporator or first stage suction pressure (or temperature) as sensed by a transducer 66 in suction conduit 48, the transducer communicating with controller 56 via a lead 68. Similarly, second stage compressors 18 and 20 may be of the fixed capacity type, with on/off modulation being performed by controller 56 in response to interstage pressure as sensed by a transducer 70 in conduit 12, the transducer communicating with controller 56 via a lead 72.

Figure 2:
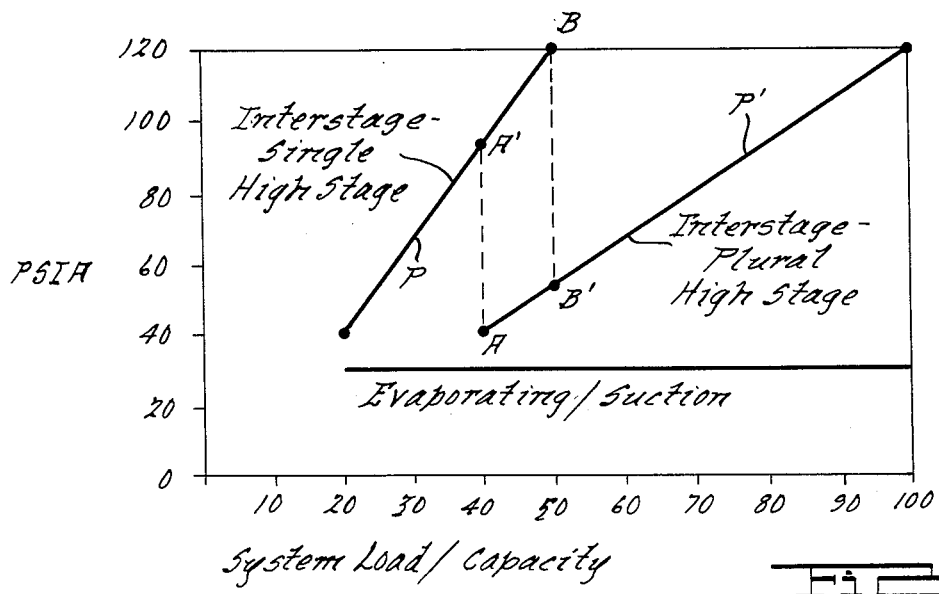
FIG. 2 is a plot of interstage pressure versus system load/capacity for the system of FIG. 1.

System operation is graphically illustrated in FIG. 2 which is a plot of suction and interstage pressure versus system load/capacity for a system having two second stage compressors. The two sloped solid lines P and P' are interstage pressure plots and the horizontal solid line is first stage suction pressure. Plot P is for low-nominal load/capacity opertaions using a single second stage compressor, whereas plot P' is for higher load/capacity operations using two second stage compressors. The capacity of the system is varied along sloped lines P and P' by modulating the capacity of booster compressor 10. Assuming, for instance, that the system is operated at conditions of low load with a single second stage compressor in operation, i.e. second stage compressor 18 or 20, and with first stage booster compressor 10 operating at relatively low capacity. As system load increases, the capcity/RPM of the booster compressor increases until the point that the interstage pressure reaches a predetermined high point along line P, i.e. point B, at which time the second high stage compressor is cut in which causes the interstage pressure to drop to the pressure at point B' on line P'. In the reverse situation, when system load is decreasing, the capacity/RPM of the booster is decreased until the second second stage compressor is deenergized at the point the interstage pressure reaches point A on line P'. This increases the interstage pressure to point A' so that the single high stage compressor will handle the same booster mass flow. System capacity can thereafter be modulated downwradly by modulating booster compressor 10. Cycling of the second stage compressors is minimized by spacing point A' from B, and B' from A. With this system cycling thus only occurs due to a system load change and is not required to balance a given load.

In the basic system two transducers are the only input required for adequate control. One is required for measuring first stage suction pressure of its equivalent, and the other is required for measuring interstage pressure or its equivalent. The control logic can be quite simple and straight-forward, and a solid state control panel may be readily implemented to effect system control under the parameters disclosed herein, using known technology.

In a three compressor system of the type illustrated in FIG. 1, the preferred compressor capacities for maximum flexibility would be for each of the second stage compressors to be of equal capacity. Thus, a failure of either second stage compressor would have identical impact on remaining system capacity.

It has been discovered that other unique and advantageous modes of operation and other compressor arrangements are possible. For example, in the system of FIG. 1 booster compressor 10 could be a variable speed compressor and second stage compressors 18 and 20 could be a large number of fixed capacity compressors or any variable capciity compression system. In this embodiment, the capacity of the second stage would be controlled in response to a parameter which parallels interstage pressure throughout the anticipated system load range, rather than on interstage pressure itself. In this case, the components of the system would be chosen so that in the range of loads anticipated, the speed of the booster compressor (e.g. 30 hz to 75 hz) would parallel the interstage pressure. In this system, therefore, the capacity of the second stage could be controlled in response to booster compressor speed, rather than interstage pressure. Since inverter power consumption is a functon of speed, control could alternatively be in response to the power consumption of the inverter-driven compressor. The booster compressor itself would be controlled in the manner already described. This arrangement and mode of operation might be beneficial in situations in which second stage capacity can be varied in proportion to compressor speed or power consumption, as the case may be.

The system of FIG. 1, with a variable capacity first stage compressor and one or more fixed or variable capacity second stage compressors, may under certain conditions, be operated with one of the entire stages reduced to zero capacity. For example, at very low condensing temperatures (e.g. 55 degrees F., with 15 degrees F. evaporator) two stages are unnecessary. Controller 56 can be wired or programmed or set so that when a very low condensing condition like this occurs all second stage compressors are shut down. For this purpose controller 56 can monitor condensing conditions by means of a conventional sensor 75 to which it is connected by a lead 77. Bypass conduit 28 and check valve 30 will permit refrigerant flow directly from the first stage to condenser 32 in this condition, while preventing any reverse flow when any second stage compressor is operating. With certain types of second stage compressors, e.g. reciprocating piston compressors with cylinder valves, it may be possible to eliminate bypass conduit 28, providing the pressure drop across the inactive second stage compressors is not excessive. A check valve 55 in conduit 54 will prevent reverse flow through conduit 54 when the second stage is deactivated. A bypass conduit 57 extending between conduit 54 and conduit 48 and having a solenoid actuated upstream pressure-regulating valve 59 therein permits economizer 40 to continue to function properly when the second stage is off (ie. control exposure of the economizer to direct suction pressure), provided valve 59 is energized to its open position. During normal operation, when both stages are operating, valve 59 will be closed.

In a refrigeration circuit in which the first stage compressor means is a variable capacity booster compressor and the second stage compressor means is two compressors in parallel, the following operating sequence can be used. Starting with all three compressors energized, and assuming that there is a progressively decreasing load on the system, the first thing that would occur is the capacity of the booster compressor would be reduced. This would continue until such as it became possible to turn off one of the second stage compressors, which would require a very slight increase in the capacity of the booster compressor to again exactly balance the existing load. Thereafter a further decrease in actual load would result in a further decrease in the capacity of the booster compressor until it became possible to turn off the second, second stage compressor, which would again require a slight increase in the capacity of the booster compressor to match the existing load. Thereafter the booster compressor would be modulated to match the load. On increasing system load the reverse sequence would be used.

Alternatively, this same arrangement of compressors may be controlled so that at very low system loads the entire first stage is shut down. In this situation bypass conduit 14 and check valve 16 will permit refrigerant flow directly from the evaporator to the second stage compressors, while preventing reverse flow when the first stage is operating. Again, this bypass arrangement may not even be necessary with certain types of compressors. In a refrigeration circuit in which the first stage compressor means is a variable capacity booster compressor and the second stage compressor means is two compressors in parallel, the following operating sequence can be used. Starting with all three compressors energized, and assuming that there is a progressively decreasing load on the system, the first thing that would occur is the capacity of the booster compressor would be reduced. This would occur until such point as it became possible to turn off one of the second stage compressors, which would require an increase in the capacity of the booster compressor to balance the load. Thereafter a further decrease in load would result in a further decrease in the capacity of the booster compressor until it reaches its minimum, at which time it is shut down. Thereafter, the remaining second stage compressor would be cycled to match load. On increasing system load the reverse sequence would be used.

Operating the system in this manner is advantageous when an economizer is used because the economizer maintains functional subcooling without redirecting its output via valve 59.

As before, in both one-stage-off operating modes the booster would be controlled in response to evaporator pressure and the second stage compressors in response to interstage pressure, or a parameter which parallels it. When the first stage is off, the interstage pressure becomes essentially the evaporator pressure and hence follows system load, and when the second stage is off, the first stage operates as a normal single stage system.

Another unique arrangement of components has been discovered which could also be very advantageous in situations in which there is very low system load, but where it is still desirable to accurately modulate capacity. As can be seen in FIG. 3, the system is generally similar to that shown in FIG. 1 (like references numerals being used for like components), however, in this system the booster compressor 10 is a variable speed compressor, second stage compressor 18 is a variable speed compressor and second stage compressor 20 is one or more fixed or variable capacity compressors. In addition, controller 56 includes an inverter 80 operating through an appropriate switch device 82 for selectively applying the inverter power to compressor 10 via lead 60 or to compressor 18 via lead 62. As a result, the system is capable of utilizing inverter 80 to modulate the speed and hence capacity of booster compressor 10 down to minimum capacity, at which time it is shut down, and thereafter, via switch 82, transferring the control of second stage compressor 18 to inverter 80 which can thereafter take over modulation of that compressor. When compressor 18 is not being inverter driven, it is driven at line voltage and frequency by controller 56 via switch 82. The arrangement thus results in considerable cost saving in that only one costly inverter is necessary for the control of two compressors.

In FIG. 4 there is graphically illustrated a manner in which the system is operated. Starting with all three compressors operating, and assuming that the system load progressively decreases until second stage compressor 20 is turned off, modulation of the system can be the same as that illustrated in FIG. 2 described above. Thereafter, once compressor 20 is shut down, inverter 80, via switch 82, will continue to control the operation of booster compressor 10, reducing its speed progressively down line P to a transfer inverter control to second stage compressor 18. At point A the booster can be shut off because it is no longer needed as evidenced by interstage pressure A being at such a low level. Below this point, falling load causes controller 56, via inverter 80 and switch 82 (which has now switched the inverter into control of compressor 18), to drop the speed and hence capacity of compressor 18, to match system load. This will occur until minimum high stage speed is reached, as at point B in FIG. 4. If system load thereafter increases, the speed of second stage compressor 18 will be increased until its RPM has reached point C in FIG. 4 (15 to 20 percent greater than the speed at point A in order to prevent unnecessary cycling), at which time second stage compressor 18 is fully energized at line voltage and frequency and inverter control is switched by switch 8 back to booster compressor 10, which is increased in RPM and hence capacity as system load continues to increase. Eventually compressor 20 can be turned on, as before.

During the period that booster compressor 10 is turned off, bypass 14 and check valve 16 operate to permit the direct flow of refrigerant from the evaporator to the second stage, in the manner described above.

Bypass conduit 14 also facilitates starting, it being a preferred practice to start the second stage before starting the first stage on initial start-up. This permits desired reducing of the first stge suction pressure prior to starting.

The normal operating range of the system would be from point A up to maximum load/RPM, whereas the range from B to C would be considered the below normal range. The system of FIGS. 3 and 4 would be appropriate in any application where it would increase efficiency to switch inverter control. For example, a booster compressor operating at 15 hertz is much less efficient than a secons stage compressor operating at 38 hertz or thereabouts. This arrangement also offers the advantage that the economizer, if used in the system, will continue to provide benefits under all operating conditions, without redirecting its output flow.

Figure 5:
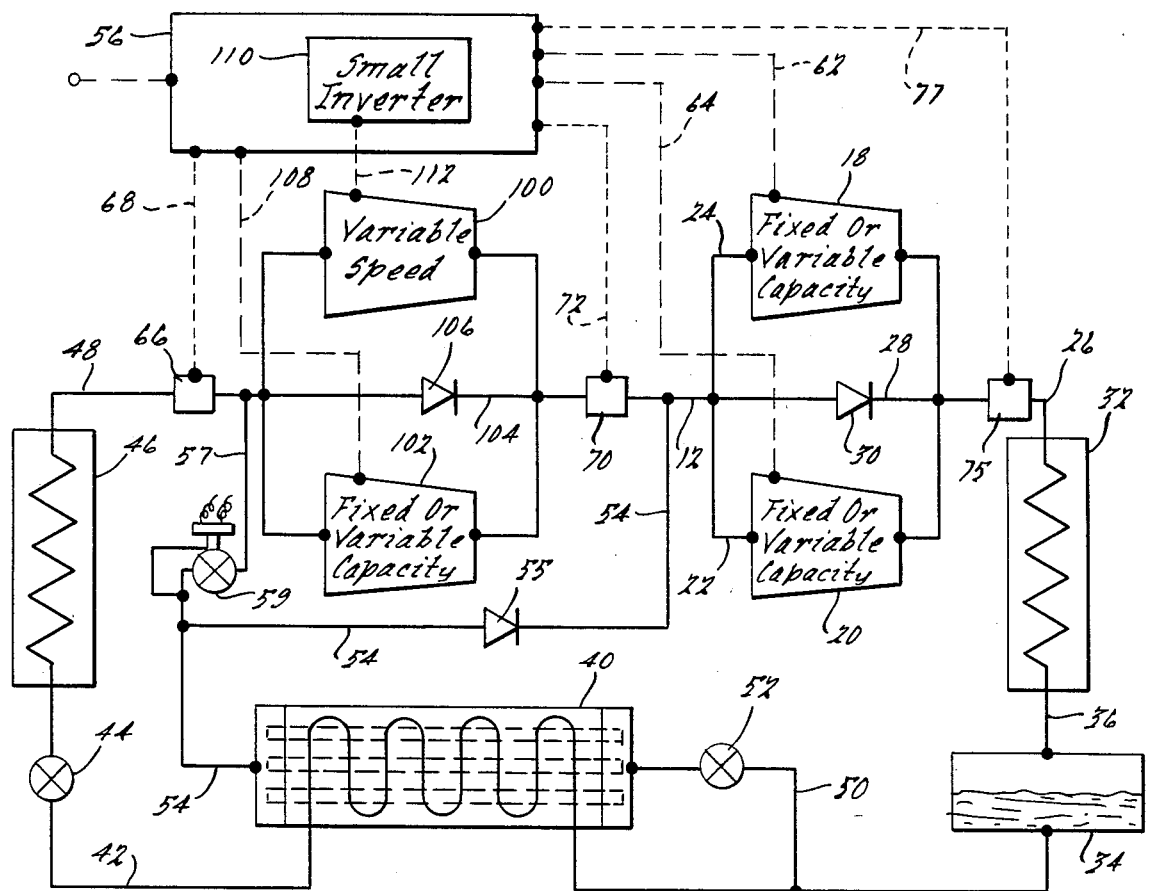
FIG. 5 is a schematic diagram of a refrigeration circuit embodying another feature of the present invention.

In FIG. 5 there is illustrated another embodiment of the invention which is advantageous in that it significantly reduces the inverter drive cost while permitting capacity modulation using variable speed motor compressors. The system of FIG. 5 is in all respects identical to that of FIG. 1 (like reference numerals being used to designate like components), with the exception that the first stage instead of being a single booster compressor now comprises a variable speed compressor 100 connected in parallel to a second first stage fixed or variable capacity compressor 102. A bypass conduit 104 with check valve 106 may be provided if total shut-down of the first stage is contemplated. Preferably, the capacity of compressors 100 and 102 total the capacity of the booster compressor they replace, with variable speed compressor 100 having a capacity which will provide th necessary modulation through the normally expected system load range. Compressor 102 is powered and controlled in the normal manner by controller 56 via a lead 108. Compressor 100, on the other hand, is powered and controlled by a relatively small inverter drive 110 forming a part of controller 56, via lead 112. In view of the fact that inverter cost increases disproportionately with power capacity, relatively small reductions in capacity result in significant cost savings. The system of FIG. 5 may be operated in exactly the same manner as the previously described embodiments.

An alternative version of the system of FIG. 5, which would also yield cost savings, is one in which both compressors 100 and 102 are inverter controlled variable speed compressors, each run by a separate small inverter (two small inverters being less expensive then one large inverter). If the two first stage compressors are of equal size, then on decreasing system load each would go down in speed until that point where one of the first stage compressors at a more efficient speed condition could handle the same load. At this point the other compressor is shut down.

Another alternative version of the system of FIG. 5 is one in which both first stage compressors are inverter driven, with switch means to drive one or the other with a single inverter. One compressor would preferably be greater in capacity than the other. The larger first stage compressor would be the normally inverter powered one with the smaller compressor being normally line powered. As the load drops the larger compressor would be slowed down to reduce its capacity to the point where it was possible to shut off the smaller line powered compressor, at which time the larger compressor would be increased in speed to balance the load. If the load continued to drop, appropriate switch means in the controller would transfer the inverter drive to the smaller compressor to operate it at very low system loads.

Figure 7:
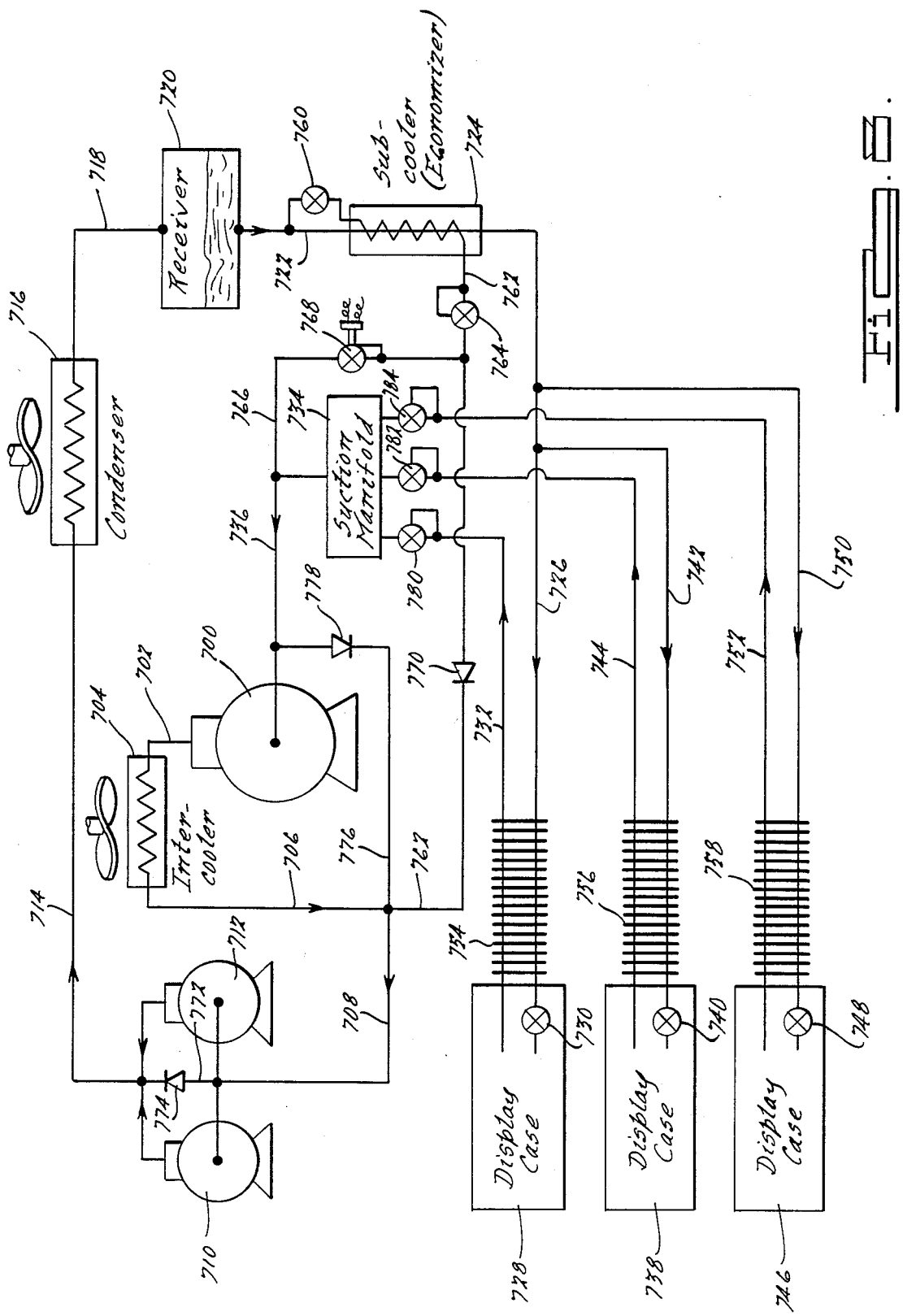
FIG. 7 is a schematic diagram of a refrigeration circuit embodying further features of the present invention.

Several additional embodiments of the invention are illustrated in FIG. 7, which shows a basic supermarket refrigeration system identical to that of FIG. 1 (like reference numbers are used to designate like components), except for several unique features which will be discussed below. For the most part each of these features has individual merit in improving efficiency and/or control, independent of the presence of the other of such features; they are shown in the same system only for exemplary purposes.

System efficiency can be measurably improved by the addition of a desuperheater (or intercooler heat exchanger 200 in booster discharge line 12. The heat exchanger is ideally water cooled, such as by water being supplied via a conduit 202 to a hot water heater or storage tank 204, hereby also providing th advantage of reducing the cost of hot water. Alternatively, it can be air cooled, if desired. During those periods when no water is available for cooling, excessive second stage discharge temperatures can be controlled by other means, such as by overfeeding the economizer to dump liquid from conduit 54 into th booster discharge gas, as will be discussed later in this specification. The use of a desuperheater is particularly beneficial in a system using R-22 refrigerant because R-22 has thermodynamic properties that result in higher compressor discharge tempratures than does R-502 or R-12. The system also provides the additional very significant benefit of making R-22 usable in low temperature applications (i.e. frozen food cases in a supermarket). This means that supermarkets can, with the present system, use a single refrigerant rather than R-22 for high and medium temperature applications and R-502 for low temperature applications. The effect of the desuperheater is to reduce overall power consumption by reducing the temperature and hence pressure of the suction gas to the second stage, which in turn reduces the power for first and second stage compression. It also reduces the temperature of the second stage discharge gas.

Another feature of the system of FIG. 7 is the provision of unique means for controlling (i.e. limiting) the temperature of the second stage discharge gas to prevent it from reaching system-damaging levels. Control of this discharge gas temperature offers a number of important advantages. One is the ability to minimize the effect of a booster failure, which otherwise would result in the second stage operating as a single stage without effective desuperheat. The dramatic increase in pressure differential across the stage would result in excessive discharge temperatures, which could cause breakdown of lubricating oil, refrigerant, etc. Another is to minimize the effect of an intercooler breakdown (loss of water, etc.) A further one is to increase the operating range of the system, which itself offers a number of advantages, including permitting operation of the sysem at much lower evaporator temperatures, which in turn permits the use of R-22 in lower temperature applications (in turn reducing refrigerant cost and the problems of handling two different refrigerants in a typical supermarket).

Figure 6:
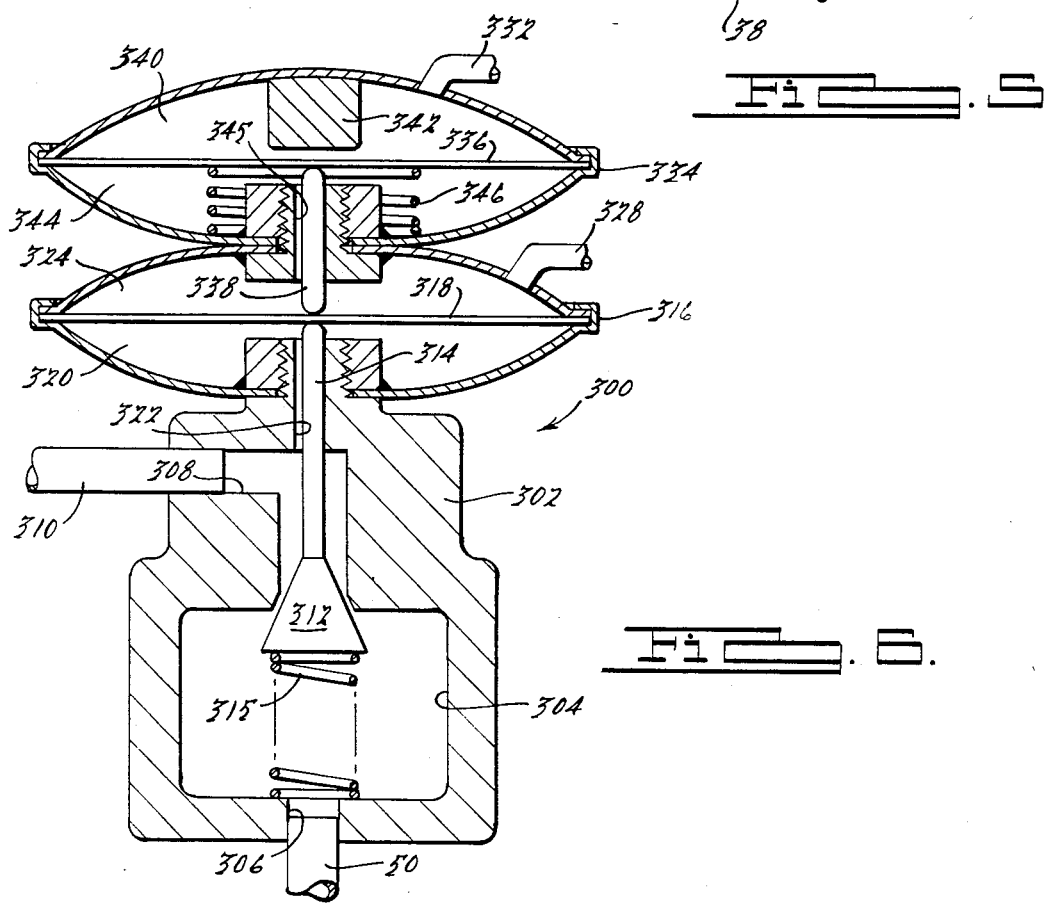
FIG. 6 is a somewhat diagrammatic longitudinal sectional view through a controlled expansion valve embodying other features of the present invention.

This aspect of the invention comprises replacing single expansion valve 52 of the FIG. 1 embodiments with a controlled expansion valve 300, an exemplary embodiment of which is best shown in FIG. 6. The system of FIG. 7 also includes an EPR (evaporator pressure regulator) valve 400 in conduit 54, and a second evaporator comprising one or more heat exchangers 600 which receive refrigerant via a branch line 602 and an expansion valve 604, the refrigerant exiting from evaporator 600 being communicated via a conduit 606 to a conventional satellite compressor 608 which is located adjacent the first stage booster compressor. In the system of the present invention the output of compressor 608 is connected to interstage conduit 12 via a conduit 610. The function of components 400-610 will be discussed later in this specification, and for purpose of discussing applicant's present concept for controlling second stage discharge gas temperature, it is immaterial whether these components are in the system or not.

Expansion valve 300 (FIG. 6) generally comprises a body 302 defining a valve chamber 304 communicating with a refrigerant inlet passageway 306 connected to conduit 50 and a refrigerant discharge passageway 308 connected to intercooler 40 via a conduit 310. Disposed within chamber 304 is expansion valve 312 having an integral stem 314 and being normally biased to its closed position by a compression spring 315. The free end of stem 314 is sealingly disposed within a diaphragm case 316 and engages a diaphragm 318 disposed therein. The sealed volume 320 disposed on the stem-side of the diaphragm is at the pressure of the expanded liquid inlet to the economizer (equivalent to the sub-cooler vapor outlet pressure) via a groove 322, passageway 308 and conduit 310. The opposite side of diaphragm 318, indicated at 324, is in fluid communication with an economizer outlet temperature sensor 326 or conduit 54 via a conduit 328. Thus, the pressure in the chamber 324 is proportional to the economizer vapor outlet temperature. Valve 312 is normally controlled by the action of diaphragm 318 in diaphragm case 316. As the temperature of the vapor leaving the heat exchanger increases relative to the vapor pressure (saturation temperature) leaving the heat exchanger, the valve is biased in an opening direction against spring 315. As the temperaure of the vapor leaving the economizer decreases, the opposite occurs. Thus, the expansion valve is controlled to keep the superheat or quality level within the desired range. Essentially, sensor 326 and pressure under diaphragm 318 control expansion valve 300 so that the valve modulates and controls the desired superheat or quality in line 54.

At very high lift conditions (beyond normal operating range), the discharge temperature of the refrigerant from the second stage may tend to rise to dangerous levels. With this embodiment of the present invention, a discharge temperature sensor 330 located on discharge conduit 26 senses excessive temperature and communicates the signal via conduit 332 to a second diaphragm case 334 sealingly disposed on top of diaphragm case 316. Diaphragm case 334 includes a diaphragm 336 acting on one end of an actuator 338, the opposite end of which engages the top of diaphragm 318. The chamber above diaphragm 336, indicated at 340, is at a pressure corresponding to the temperature signal sent from sensor 330 via conduit 332 and contains a stop element 342 to limit the upward movement of diaphragm 336. The chamber on the opposie side of diaphragm 336, indicated at 334, is at line 328 pressure via a groove and contains a control spring 346 which biases diaphragm 336 in an upward direction, as shown, so that it does not normally interfere with the function of diaphragm case 316.

The components are designed so that normally there is no downward force exerted by actuator 338 on diaphragm 318. On the other hand, when excessive temperatures are encountered in the second stage discharge then the resultant increase in pressure in chamber 340 causes diaphragm 336 to overcome spring 346 and push actuator 338 downwardly to cause diaphragm 318 to move downwardly and further open valve 312. This causes overfeeding or flooding of the economizer. Thus, the output of sensor 330 overrides the normal control of sensor 326 and the excess liquid which flows back to the interstage conduit via conduit 54 boils when it mixes with the discharge from the first stage compressor, thereby cooling the first stage discharge gas. This in turn reduces the temperature of the second stage discharge gas to bring it back into the desired range. Although there may be a loss in efficiency during this over-feeding condition, the overall effect is to greatly expand the pressure ratio range at which the system may operate. It will be appreciated that expansion valve 300 and the control thereof disclosed herein is merely one way in which the objects of the invention may be accomplished. Motor driven expansion valves, operating in response to thermister sensors, and like devices may alernatively be used if they are properly arranged to provide the aforesaid functions.

In some refrigeration applications it may be desirable to prevent the liquid temperature generated in line 42 by economizer 40 from dropping too low, e.g. below 35 degrees F. in a typical installation. If line 42 is too long and is poorly insulated a very low liquid temperature in that line will contribute to unnecessary heat gain and cause a reduction in system efficiency due to that heat gain. Also, if the line is located in an area where ice build-up would occur, that would be an additional problem. this could be significant because the nature of the system disclosed is such that liquid temperature may drop as the system load changes.

Applicant has discovered a way to prevent this excessive temperature drop which will not cause any reduction in the theoretical system performance over and above that which would occur were the temperature allowed to drop in the basic system. This is accomplished by the provision of EPR valve 400, which responds to pressure in line 54 upstream of the valve (via conduit 402). If this pressure starts to drop below that pressure which is desired for minimum liquid line temperature, valve 400 throttles down to maintain the upstream pressure and thus liquid temperature generated by economizer 40.

One significant advantage of applicant's system for controlling liquid temperature is that it facilitates the use of liquid-suction cooling, i.e. heat transfer between the liquid-line to each expansion-valve-plus-evaporator unit and the gas suction line leaving such unit, either by line-to-line heat exchange or using a heat exchanger. Line-to-line heat exchange could be accomplished by soldering the two lines together, wrapping them together within an insulated passageway, twisting them together and/or wrapping one around the other. Liquid-suction heat exchange has well known advantages but is rarely used because of the danger of suction overheating. In the present system, however, with liquid temperature control, such heat exchange may be safely used.

Applicant has also discovered that with his present system it is possible to very economically cool one or more ultra-low temperature evaporators (e.g. those used in ice cream freezers at approximately −40 degrees F., as distinguished from approximately −25 degrees F. which is found in most frozen food display cases). As can be visualized in FIG. 7, expansion valve 604 and evaporator 600 would be installed in an ice cream freezer display case, for example, communicating via conduit 606 with compressor 608, the discharge of which is connected to interstage conduit 12 via conduit 610. Because compressor 608 has to operate only at a relatively low pressure ratio, it can be of relatively low power. For example, in a given installation the conventional way to handle this application might be to put a 5 hp compressor of a given displacement in parallel with both stages, whereas with the present system the same amount of refrigeration may be obtained using a 2 hp compressor having the same capacity. If compressor 608 is of fixed capacity it will probably need an upstream EPR valve (not shown) to prevent the evaporator 600 from getting too cold; however compressor 608 is of such low power that it would be relatively inexpensive to power it at variable speed with an inverter drive, in which case an EPR valve is not required for the controlling of evaporator temperature.

In FIG. 8 there is disclosed in a somewhat different manner, but schematically, a refrigeration circuit embodying the features of the present invention which are believed to constitute the ideal, practical supermarket refrigeration system. The system comprises a variable speed inverter-driven booster compressor 700 having a discharge conduit 702 communicating with an air-cooled intercooler 704, the output from which flows via an interstage conduit 706 to a conduit 708 which communicates directly with the suction inlet of two second stage fixed capacity compressors 710 and 712, connected in parallel. The output of the second stage compressors flows into a discharge conduit 714 to a conventional air-cooled condenser 716 from which the condensed fluid flows via a conduit 718 to a receiver 720. Liquid from receiver 720 flows via a conduit 722 through an economizer 724 into liquid conduit 726 which communicates with one of the supermarket food display cases 728 via an expansion valve 730. Display case 728 contains the normal evaporator which receives and uses the expanded refrigerant from valve 730 in the conventional manner for cooling purposes, the output from the evaporator flowing through a suction conduit 732 to a suction manifold 734 which is in fluid communication with the booster compressor suction inlet via a suction line 736.

A typical supermarket installation will usually have a large number of display cases, perhaps 30 or more; however, for simplicity only three are illustrated in FIG. 8. For example, display case 738 having expansion valve 740 is supplied by a liquid conduit 742 connected to conduit 726 and has a return suction conduit 744 connected to suction manifold 734. Similarly, display case 746 has an expansion valve 748 supplied by a liquid conduit 750 connected to conduit 726,and has a return suction conduit 752 connected to suction manifold 734.

One of the particularly advantageous features of the system of FIG. 8 is that each of the display cases is provided with liquid-suction heat exchange, utilizing line-to-line heat exchanger 754, 756 and 758 for cases 728, 738 and 746, respectively. Each of these line-to-line heat exchangers permits heat transfer between the liquid inlet line entering the display case and the suction vapor line exiting the display case. This arrangement provies for worthwhile superheating of the suction vapor by supercooling the liquid instead of by picking up heat from the ambient area within the building (via the suction return conduits), thus significantly enhancing performance and efficiency. Insulating the suction lines will further minimize the amount of superheating which may occur as a result of heat transer with the ambient environment. Furthermore, the overall system is so successful in providing total control over liquid line temperature that there is no danger of the line-to-line heat exchangers causing excessive suction temperatures, as can occur in known systems. For example, the system can be easily operated in such a manner that the temperature of the liquid in the liquid lines will never exceed 50 degrees F. This automatically assures that the suction temperatures will never reach a dangerous level.

As in the previous embodiments, a portion of the liquid refrigerant from th receiver is expanded via an expansion valve 760 and thereafter used to subcool the liquid passing from the receiver to the evaporators, the expanded refrigerant then flowing through a conduit 762 to interstage conduit 708 from which it flows into the second stage compressors. An EPR valve 764 may be provided in conduit 762 to insure that the liquid lines do not get too cold. Valve 462 functions in the same manner and for the same purpose as valve 400 in the embodiment of FIG. 7. In addition, a bypass conduit 766 having a solenoid actuated upstream pressure regulating valve 768 therein is connected between return line 762 and the booster suction conduit 736, these components performing the same function as conduit 57 and valve 59 in FIG. 7. Conduit 762 has a check valve 770 therein which performs the same function as check valve 55 in FIG. 7 when one of the stages is shut down.

A bypass conduit 772 having a check valve 774 therein is provided in parallel with the second stage compressors to permit through-flow in the event the second stage is shut down. Similarly, a bypass line 776 having a check valve 776 therein is provided in parallel with booster compressor 700 to provide for through-flow in the event the first stage is shut down, all as discussed in connection with the previous embodiments. Evaporator vapor return lines 732, 744 and 752 each may have an EPR valve 780, 782 and 784, respectively to insure the pressure and hence temperature of the return lines does not drop too low. The system of FIG. 8 will operate in the same manner, and use the same controls, as disclosed in connection with the preceeding embodiments.

While it will be apparent that the preferred embodiments of the invention disclosed are well calculated to provide the advantages and features above stated, it will be appreciated that the invention is susceptible to modification, variation and change without departing from the proper scope of fair meaning of the subjoined claims.

I claim:

1. A system comprising:
   a variable capacity first stage compressor;
   at least two second stage compressors;
   conduit means bearing a compressible refrigerant connecting said first stage compressor to said second stage compressors, said second stage compressors being connected in parallel with each other;
   motors for driving said compressors; and
   control means for controlling said first stage compressor and said second stage compressors, said control means being operable to vary the capacity of said first stage compressor while said second stage compressors are operating, to shut down one of said second stage compressors when the capacity of said first stage compressor reaches a predetermined minimum and thereafter to increase the capacity of said first stage compressor while continuing to operate the remaining second stage compressors.

2. A system as claimed in claim 1, wherein said control means includes sensing means for sensing interstage refrigerant pressure within said conduit means and means responsive thereto for shutting down at least one of said second stage compressors when the interstage pressure reaches a predetermined minimum.

3. A system as claimed in claim 1, wherein at least one of said second stage compressors is a variable capacity compressor.

4. A refrigeration system comprising:
a first stage variable speed compressor;
second stage variable capacity compressor means;
conduit means bearing a compressible refrigerant interconnecting said first stage compressor with said second stage compressor means; and
control means for modulating the capacity of said second stage compressor means in response to a parameter which parallels a condition in said conduit means;
a condenser and an evaporator operatively connected in series between the discharge outlet of said second stage compressor means and the suction inlet of said first stage compressor;
a refrigerant subcooler for subcoling refrigerant flowing from said condenserto said evaporator;
said subcooler normally expanding a portion of the condensed refrigerant downstream of said condenser for subcooling refrigerant flowing to said evaporator, and
means for feeding said expanded portion of refrigerant to said conduit means between the outlet of said first stage compressor means and the inlet of said second stage compressor means.

5. A refrigerant compressing system comprising:
a first stage variable speed compressor;
second stage variable capacity compressor means;
conduit means bearing a compressible refrigerant interconnecting said first stage compressor with said second stage compressor means; and
control means for modulating the capacity of said second stage compressor means in response to the speed at which said first stage compressor is operating.

6. A refrigerant compressing system comprising:
a first stage variable speed compressor;
second stage variable capacity compressor means;
conduit means bearing a compressible refrigerant interconnecting said first stage compressor with said second stage compressor means; and
control means for modulating the capacity of said second stage compressor means in response to the power consumption of said first stage compressor.

7. A sysem comprising:
variable capacity first stage compressor means;
variable capacity second stage compressor means;
conduit means bearing a compressible refrigerant connecting said first stage compressor means to said second stage compressor means;
motor means for powering said first and second stage compressor means;
control means for controlling said motor means, said control means being operable to vary the capacity of both of said stages and to totally shut down one of said stages;
means permitting refrigerant to bypass said one of said stages when shut down.

8. A system as claimed in claim 7, wherein said one of said stages is said first stage.

9. A system as claimed in claim 7, wherein said one of said stages is said second stage.

10. A system as claimed in claim 7, wherein said first stage compressor means comprises a variable capacity booster compressor and said second stage compressor means includes two compressors in parallel.

11. A system as claimed in claim 10, wherein each of said second stage compressors is a fixed capacity compressor.

12. A system as claimed in claim 10, wherein at least one of said second stage compressors is a variable capacity compressor.

13. A system as claimed in claim 10, wherein said control means upon detecting a decreasing system load first reduces the capacity of said booster compressor until such point as it became possible to turn off one of said second stage compressors, said controller means upon a further decrease in system load reducing the capacity of said booster compressor until it is minimum, said control means thereafter cycling said remaining second stage compressor to match system load.

14. A system as claimed in claim 10, wherein said control means upon detecting a decreasing system load first reduces the capacity of said booster compressor until such point as it became possible to turn off one of said second stage compressors, said controller means upon a further decrease in system load further reducing the capacity of said booster compressor until it becomes possible to shut down the second second stage compressor, said control means thereafter modulating the capacity of said booster compressor to match system load.

15. A system as claimed in claim 7, wherein a condenser and an evaporator are operatively connected in series between the discharge outlet of said second stage compressor means and the suction inlet of said first compressor means, said system further comprising a refrigerant subcooler for subcooling refrigerant flowing from said condenser to said evaporator.

16. A system as claimed in claim 15, wherein said subcooler normally expands a portion of the condensed refrigerant downstream of said condenser for subcooling refrigerant flowing to said evaproator, and further comprising means for feeding said expanded portion of refrigerant to said conduit means between the outlet and said first stage compressor means and the inlet of said second stage compressor means.

17. A system as claimed in claim 16, further comprising means for transferring the feed of said expanded refrigerant from said conduit means to the suction inlet of said first stage compressor means when said second stage is shut down.

18. A method for controlling a system including a variable capacity first stage compressor and two second stage motor compressors connected in parallel with one another, said method comprising the following steps:
(a) in response to decreasing system load first reducing the capacity of one of said stages;
(b) upon further decrease in system load reducing the capacity of the other of said stages;

(c) upon further decrease in system load reducing the capacity of either one of said stages to minimum; and (d) thereafter modulating the remaining operating stage to match system load.

19. A method as claimed in claim 18, wherein said system is controlled in response to a progressively decreasing system load in the followingsequence of steps, in order:

(a) the capcity of the first stage is reduced;
(b) the capacity of the second stage is reduced;
(c) the capcity of the first stage is reduced to minimum; and
(d) the capacity of the second stage is modulated to match system load.

20. A method as claimed in claim 18, wherein said system is controlled in response to a progressively decreasing system load in the following sequence of steps, in order:

(a) the capacity of the first stage is reduced;
(b) the capacity of the second stage is reduced;
(c) the capcity of the first stage is reduced further;
(d) the capacity of the second stage is reduced to minimum; and
(e) the capacity of th first stage is modulated to match system load.

21. A system comprising:
(a) first stage compressor means including at least one variable speed motor-compressor;
(b) second stage compressor means including at least one variable speed motor-compressor in fluid communication with said first stage compressor means; and
(c) power supply means for supplying power to each of said motor-compressors, said power supply means including
    (1) a variable speed motor controller normally connected to said first stage motor-compressor to vary the capacity thereof, and
    (2) means for de-energizing said first stage motor-compressor and for connecting said motor controller to said second stage motor-compressor to vary the capacity thereof at low system load conditions.

22. A system as claimed in claim 21, wherein during the normal system load range said second stage motor-compressor is operated at a fixed speed with said power supply means varying the speed and hence capacity of said first stage motor-compressor in response to a system load condition.

23. A system as claimed in claim 22, wherein during a below-normal system load range said power supply means deenergizes said first stage motor-compressor and thereafter varys the speed and hence capacity of said second stage motor-compressor in response to a system load condition.

24. A system as claimed in claim 23, wherein said two load ranges partially overlap one another.

25. A system as claimed in claim 24, wherein said overlap is approximatly 10% to 25% of the range between no system load and maximum system load.

26. A system as claimed in claim 23, wherein said power supply means switches to said second stage motor-compressor when it improves efficiency to do so.

27. A system as claimed in claim 22, further comprising a condenser, an evaporator and conduit means bearing a compressible refrigerant interconnecting said first stage compressor means, said second stage compressor means, said condenser, and said evaporator, in series in a closed loop, in that order;

an economizer operatively disposed between said condenser and evaporator for expanding a portion of the condensed refrigerant from said closed loop downstream of said condenser for subcooling refrigerant flowing to said evaporator; and means for feeding said expanded portion of refrigerant to an interstage point between the outlet of said first stage compressor means and the inlet of said second stage compressor means.

28. A system as claimed in claim 21, further comprising a bypass conduit in parallel with said first stage compressor means, and a check valve therein for permitting flow to said second stage compressor means when said first stage compressor means is de-energized.

29. A system as claimed in claim 21, wherein said first stage motor-compressor is greater in maximum capacity than said second stage motor-compressor.

30. A system as claimed in claim 21, wherein said motor controller includes a variable frequency inverter for powering said motor-compressors at varying speeds.

31. A method for controlling a system including two variable speed motor compressors connected in series, and a single inverter, said system being operable in a normal-load range and in a low-load range, said method comprising the following steps:

(a) operating both compressors when the system load is in said normal-load range with said inverter varying the speed of the first motor-compressor to vary its refrigeration capacity in response to system load;
(b) de-energizing said first motor-compressor when the system load drops below a certain first load point; and
(c) thereafter connecting said inverter to the second compressor to vary its refrigeration capacity in response to system load.

32. A method for controlling a system as claimed in claim 31, wherein a subsequent increase in system load to a predetermined point in said normal-range causes said second motor-compressor to be run at full speed, said first motor-compressor to be reenergized, and said inverter to be reconnected to said first compressor to control the capacity thereof.

33. A method for controlling a system as claimed in claim 31, wherein said second load point is higher in value than said first load point to prevent undesirable cycling.

34. A system comprising:
(a) At least two first stage motor-compressors, at least one of said first stage motor-compressors being a variable speed motor-compressor, both of said first stage motor-compressors being connected in parallel;
(b) second stage compressor means;
(c) conduit means bearing a compressible refrigerant connecting said first stage motor-compressors to said second stage compressor means;
(d) inverter drive means for normally powering said variable speed first stage motor-compressor and the other of said motor-compressors being normally line powered; and
(e) control means for controlling said two motor-compressors, said control means including said inverter means.

35. A system as claimed in claim 34, wherein both of said first stage motor-compressors are variable speed motor-compressors.

36. A system as claimed in claim 35, wherein said control means includes separate inverters for powering each of said motor-compressors.

37. A system as claimed in claim 36, wherein said control means operates to reduce the speed of both said motor-compressors as system load decreases until that point where one of said motor-compressors can more efficiently handle system load, and at that point to shut down one of said first stage motor-compressors.

38. A system as claimed in claim 37, wherein said two motor-compressors are of substantially equal capacity.

39. A system as claimed in claim 35, wherein said control means operates to reduce the speed of said one motor-compressor as system load decreases.

40. A system as claimed in claim 34, wherein upon further decrease in system load said control means shuts down said other motor-compressor and increases the speed of said one motor-compressor to balance system load.

41. A system as claimed in claim 40, wherein upon further decrease in system load said control means shuts down said one motor-compressor and transfers inverter power to said other motor-compressor to provide variable capacity at very low system loads.

42. A system as claimed in claim 41, wherein said one motor-compressor is of greater capacity than said other motor-compressor.

* * * * *

UNITED STATES PATENT AND TRADEMARK OFFICE
CERTIFICATE OF CORRECTION

PATENT NO. : 4,787,211

DATED : November 29, 1988

INVENTOR(S) : David N. Shaw

It is certified that error appears in the above-identified patent and that said Letters Patent is hereby corrected as shown below:

Column 1, lines 61, 62, "provided" should be -- provides --.

Column 2, line 38, "compriises" should be -- comprises --.

Column 2, line 45, "circut" should be -- circuit --.

Column 2, line 54, "prforms" should be -- performs --.

Column 3, line 52, "opertaions" should be -- operations --.

Column 3, line 62, "capcity" should be -- capacity --.

Column 4, line 7, "downwradly" should be -- downwardly --.

Column 4, line 15, "of" should be -- or --.

Column 4, line 34, "capciity" should be -- capacity --.

Column 5, line 26, after "such" insert -- point --.

Column 6, line 45, after "a" insert -- speed which corresponds to point A. At that point, switch 82 would --.

UNITED STATES PATENT AND TRADEMARK OFFICE
CERTIFICATE OF CORRECTION

PATENT NO. : 4,787,211

DATED : November 29, 1988

INVENTOR(S) : David N. Shaw

It is certified that error appears in the above-identified patent and that said Letters Patent is hereby corrected as shown below:

Column 6, line 61, "8" should be -- 80 --.

Column 7, line 4, "stge" should be -- stage --.

Column 7, line 13, "secons" should be -- second --.

Column 7, line 33, "th" should be -- the --.

Column 8, line 10, after "and" delete --   -   --.

Column 8, line 15, after "intercooler" insert -- ) --.

Column 8, line 19, "hereby" should be --> thereby --.

Column 8, line 19, "th" should be -- the --.

Column 8, line 25, "th" should be -- the --.

Column 8, line 30, "tempratures" should be -- temperatures --.

Column 8, line 58, "sysem" should be -- system --.

Column 9, line 63, "opposie" should be -- opposite --.

Column 9, line 64, "334" should be -- 344 --.

Column 10, line 36, "this" should be -- This --.

Column 11, line 68, "provies" should be -- provides --.

Column 12, line 6, "transer" should be -- transfer --.

UNITED STATES PATENT AND TRADEMARK OFFICE
CERTIFICATE OF CORRECTION

PATENT NO. : 4,787,211

DATED : November 29, 1988

INVENTOR(S) : David N. Shaw

It is certified that error appears in the above-identified patent and that said Letters Patent is hereby corrected as shown below:

Column 12, line 18, "th" should be -- the --.

Column 12, line 39, "776" should be -- 778 --.

Column 13, line 32, "subcoling" should be -- subcooling --.

Column 13, line 33, "condenserto" should be -- condenser to --.

Column 13, line 61, "sysem" should be -- system --.

Column 14, line 51, "evaproator" should be -- evaporator --.

Column 15, line 8, "followingsequence" should be -- following sequence --.

Column 15, line 10, "capcity" should be -- capacity --.

Column 15, line 12, "capcity" should be -- capacity --.

Column 15, line 22, "capcity" should be -- capacity --.

Column 15, line 25, "th" should be -- the --.

Signed and Sealed this

Fifth Day of February, 1991

Attest:

HARRY F. MANBECK, JR.

Attesting Officer

Commissioner of Patents and Trademarks